United States Patent [19]

Nakanishi

[11] 3,983,448

[45] Sept. 28, 1976

[54] AUTOMATIC STROBO FLASH DEVICE

[75] Inventor: Shinichiro Nakanishi, Higashi-Osaka, Japan

[73] Assignee: West Electric Company, Ltd., Japan

[22] Filed: May 8, 1975

[21] Appl. No.: 575,488

[30] Foreign Application Priority Data

May 16, 1974 Japan .......................... 49-56159[U]

[52] U.S. Cl. ................................ 315/151; 315/159; 315/241 P

[51] Int. Cl.² .................... H05B 41/00; H05B 41/32; G03B 15/05

[58] Field of Search .......................... 315/151, 241 P

[56] References Cited

UNITED STATES PATENTS

| | | | |
|---|---|---|---|
| 3,688,664 | 9/1972 | Mashimo | 315/241 P X |
| 3,740,610 | 6/1973 | Roncke | 315/241 P |

*Primary Examiner*—Robert Segal

*Attorney, Agent, or Firm*—Burgess Ryan and Wayne

[57] ABSTRACT

In an automatic strobo flash device of the type in which when the quantity of light reflected back from a subject reaches a predetermined level, a switching capacitor is discharged to turn off a silicon-controlled rectifier connected in series to a flash tube so that the strobo flash is automatically extinguished, an indicating means for generating the sound or light signal indicating that the recharge of the switching capacitor is still being made is provided which is actuated when the voltage across a voltage regulator element such as a zener diode inserted in a circuit for recharging the switching capacitor reaches a predetermined level. A malfunction or erratic operation of the strobo flash device may be easily detected, and the correct strobo flash automatically controlled may be ensured.

8 Claims, 2 Drawing Figures

AUTOMATIC STROBO FLASH DEVICE

BACKGROUND OF THE INVENTION

The present invention relates to a strobo flash device of the type in which the quantity of strobo light may be automatically controlled for the optimum flash exposure.

In the conventional automatic strobo flash devices of the type disclosed in Japanese Patent Publication No. 30,905/1969 1 and U.S. Pat. No. 3,591,829, a strobo tube is connected in series to a first current control element which, in turn, is connected in parallel to a control circuit consisting of a switching capacitor and a second current control element. A photometric circuit is provided in order to detect the quantity of light reflected back from a subject. When the quantity of reflected light reaches a predetermined level, the photometric signal generates a signal in response to which the second current control element is conducted to discharge the switching capacitor so that the first control element is turned off to extinguish the flash tube. Therefore, a part of the energy stored on a main flash capacitor is converted into light depending upon the distance to a subject, so that the loss of the energy of a power supply may be prevented. Moreover, when the distance to a subject is relatively shorter, the flash interval or time between flashes may be reduced so that the successive flash exposures may be effected at a shorter interval without missing a chance.

When the stobo tube is lighted, the large current of the order of hundreds ampers flows through the first current control element, so that the switching capacitor must be accordingly so large as to flow the large reverse current to turn off the first current control element. It takes some time before the switching capacitor is recharged to a level sufficiently high to turn off the first current control element. When the strobo tube is lighted before the switching capacitor has not reached yet this level, the first current control element cannot be turned off by the discharge of the switching capacitor even when the second current control element is turned on in response to the output signal from the photometric circuit. As a consequence, the desired automatic control of the quantity of light cannot be attained. The flash duration is extremely short and is of the units of millisecond, so that it is impossible to detect by vision whether or not the automatic light quantity control has been successfully accomplished.

SUMMARY OF THE INVENTION

In view of the above, one of the objects of the present invention is to ensure the automatic control of the exposure by the detection whether or not a control circuit for controlling the on-off operation of a first control element connected in series to a strobo tube is in the state ready for the next flash operation.

Another object of the present invention is to provide an automatic strobo flash device capable of detecting and indicating whether or not the strobo flash device is ready for the automatic control of the exposure.

A further object of the present invention is to provide an automatic strobo flash device capable of indicating the manual light control mode in which all of the power stored on a main flash capacitor is converted into light.

A further object of the present invention is to provide an automatic strobo flash device capable of indicating whether or not the strobo flash device is ready for the automatically controlled exposure, whether or not the strobo device is in the manual mode and whether or not the automatically controlled exposure has been correctly made without any failure so that an operator may confirm whether the optimum flash exposure has been made or not and may detect the malfunction and erratic operation of the strobo flash device.

According to the present invention, to the above and other objects, a voltage regulator element is inserted in a circuit for recharging a switching capacitor, and is connected to an oscillator circuit which is energized when the voltage across the voltage regulator element reaches a predetermined level. And indicating means is connected to the oscillator circuit, and is actuated in response to the output signal therefrom for generating the signal indicating that the switching capacitor is still being recharged.

DESCRIPTION OF THE PREFERRED EMBODIMENT

Figure 1:
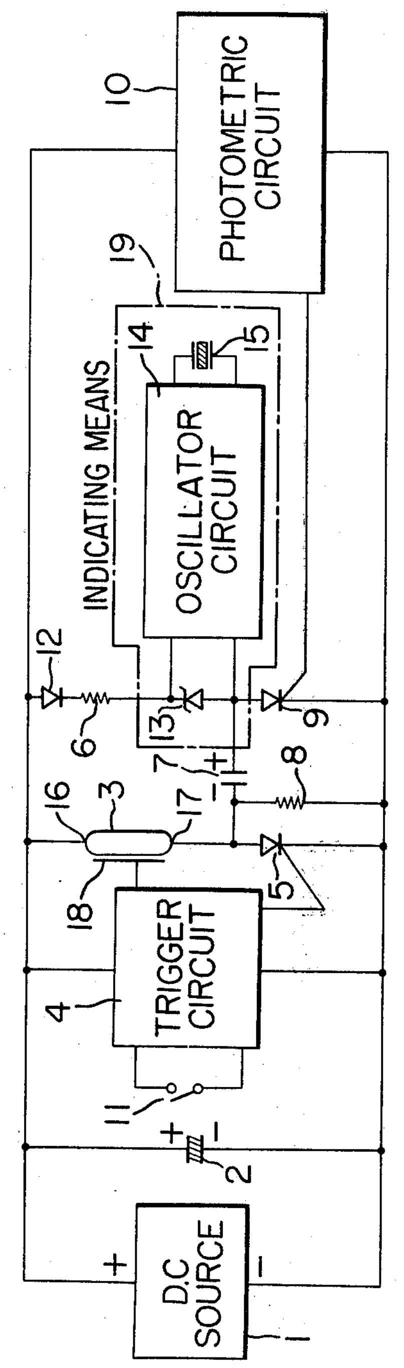
FIG. 1 is a circuit diagram of one preferred embodiment of the present invention.
Figure 2:
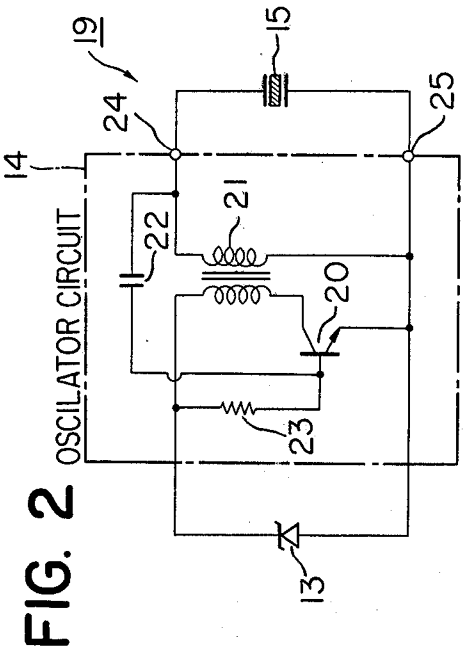
FIG. 2 is a detailed circuit diagram of an indicating means thereof.

The preferred embodiment shown in FIG. 1 comprises a high-voltage DC source 1 such as a layer-built cell or a transistorized booster of the type disclosed in U.S. Pat. No. 3,569,779; a main flash capacitor 2; a strobo tube 3 with the anode 16, the cathode 17 and the trigger electrode 18; a trigger circuit 4 for triggering the strobo tube 3 and a first SCR 5 and of the type disclosed in Japanese Patent Publication No. 30,905/1969; charging resistors 6 and 8 for charging a switching capacitor 7; a second SCR 9; a photometric circuit 10 of the type disclosed in the above Japanese Patent Publication No. 30,905/1969 and in U.S. Pat. No. 3,591,829 for measuring the intensity of light reflected from a subject; a switch 11 connected to a synchronized contact (not shown) of a camera; a diode 12 for preventing the discharge of the switching capacitor 7 through the strobo tube 3; a voltage-regulator diode 13 such as a Zener diode; an oscillator circuit 14; and an indicating device 15 for indicating the charging condition of the switching capacitor. In the instant embodiment, the indicating device 15 consists of a piezoelectric type buzzer which responds to a predetermined oscillation frequency to generate sound. As shown in FIG. 2, a circuit for indicating the recharging condition of the switching capacitor 7 comprises the Zener diode 13, the oscillator circuit 14, and the indicating device 15. The oscillator circuit 14 comprises a transistor 20, a transformer 21, a capacitor 22, a resistor 23 and output terminals 24 and 25.

Next the mode of operation will be described. The current from the high-voltage DC power supply 1 flows to charge the main flash capacitor 2 and the switching capacitor 7 through the diode 12, the resistor 6, the Zener diode 13 and the resistor 8. When the switch 11 is closed, the trigger circuit 4 is actuated to give the trigger pulse to the trigger electrode 18 of the strobo tube 3 and to the gate of the first SCR 5 to turn it on. The strobo tube 3 is lighted by the discharge of the main flash capacitor 2.

The light reflected back from the subject is received by the photometric circuit 10, so that when the quantity of light reaches a predetermined level, the trigger signal is applied to the gate electrode of the second SCR 9 from the photometric circuit 10. The second SCR 9 is turned on so that the switching capacitor 7 is discharged. As a result, the anode voltage of the first SCR 5 is reduced below the holding voltage so that the first SCR 5 is turned off and the main flash capacitor 2 is recharged.

After the switching capacitor 7 is discharged, the current flows from the power supply 1 and the main flash capacitor 2 through the diode 12, the resistor 6, the voltage regulator diode 13 and the resistor 8, so that the switching capacitor 7 is recharged and the voltage across the Zener diode 13 reaches such a level as to make the transistor 20 conductive. Then the oscillator circuit 14 is actuated to drive the indicating device 15 to generate the sound signal. As the recharge of the switching capacitor 7 is almost completed, the charging current becomes very small so that the voltage across the diode 13 drops below a level for holding the transistor 20 on. Therefore, the oscillator circuit 14 is de-energized so that the indicating device 15 stops generating sound. In other words, the indicating device 15 keeps generating the sound signal as long as the switching capacitor 7 is still being recharged, and when the switching capacitor 7 is completely recharged, the indicating device 15 stops generating the sound signal, so that the switch 11 may be closed at any time to start the automatically controlled strobo exposure.

In the instant embodiment, the diode 12 is connected in series to the Zener diode 13 in order to prevent the large current from flowing from the main flash capacitor 2 through the strobo tube 3 when the strobo tube 3 is lighted, thereby preventing the damage to the Zener diode 13 and the waste of the energy stored on the switching capacitor 7.

In the instant embodiment, the indicating device 15 has been described as generating the sound signal, but it will be understood that instead of the buzzer, a suitable visual indicating means such as a light-emitting diode (not shown) may be used. Alternatively, the combination of a buzzer and a visual indicating means may be used.

In the manual mode in which the output or quantity of light of the strobo tube 3 is not automatically controlled in the manner described above, a mode selection switch (not shown) is switched from the automatic mode to the manual mode so that the second SCR 9 may be not conductive even when the strobo tube 3 is lighted. Therefore, the first SCR 5 remains conducting so that flash by the strobo tube 3 is not interrupted. That is, the flash duration in the manual mode depends upon the resistance of the tube 3 and the capacitance of the main flash capacitor 2, and the indicating device 15 will not generate the sound signal because the switching capacitor 7 is not recharged after the strobo tube 3 has been lighted.

As described above, according to the present invention after the strobo tube 3 has been lighted in the automatic control mode, the indicating device 15 generates the sound or light signal indicating the recharging of the switching capacitor so that the failure in the automatic control of the exposure due to an unsatisfactorily low voltage across the switching capacitor may be prevented.

What is claimed is:

1. An automatic strobo flash device of the type comprising, a DC power supply; a main flash capacitor connected in parallel to said DC power supply; a strobo tube which is coupled to said flash capacitor and is lighted by the discharge of said flash capacitor; a first control element connected in series to said strobo tube for controlling the current flowing through said strobo tube; a trigger circuit for generating the trigger signal to be applied to the trigger electrode of said strobo tube and to said first control element; a photometric circuit for detecting the quantity of light reflected back from a subject and generating the signal when the quantity of reflected light reaches a predetermined level; a control circuit for controlling said first control element comprising a second control element which is turned on in response to the signal from said photometric circuit and a switching capactor; and a circuit for charging said switching capacitor; characterized in that indicating means for indicating the signal during the recharge of said switching capacitor is connected to said switching capacitor charging circuit.

2. An automatic strobo flash device as defined in claim 1 wherein said indicating means comprises means for generating a voltage when the current for recharging said switching capacitor flows through said voltage generating means; and means connected to said voltage generating means for generating the signal indicating the recharging condition of said switching capacitor in response to the voltage generated by said voltage generating means.

3. An automatic strobo flash device as defined in claim 2 wherein excessive current blocking means is connected in series to said voltage generating means.

4. An automatic strobo flash device as defined in claim 3 wherein said excessive current blocking means comprises a rectifier element connected in series and in back-to-back relation to said voltage regulator element.

5. An automatic strobo flash device as defined in claim 2 wherein said voltage generating means comprises a voltage regulator element inserted into said switching capacitor charging circuit; and said indicating signal generating means comprising an oscillator circuit which is actuated when the voltage across said voltage regulator element reaches a predetermined level, and means which is actuated in response to the output signal from said oscillator circuit for generating the indicating signal.

6. An automatic strobo flash device as defined in claim 5 wherein said indicating signal generating means generates the sound indicating signal.

7. An automatic strobo flash device as defined in claim 5 wherein said indicating signal generating means generates the light indicating signal.

8. An automatic strobo flash device as defined in claim 5 wherein said indicating signal generating means comprises means for generating the sound indicating signal, and means for generating the light indicating signal.

* * * * *